April 13, 1948.  D. H. MITCHELL  2,439,409
SYSTEM FOR PROVIDING AN ENERGIZING DIRECT CURRENT
Filed Feb. 6, 1943  2 Sheets-Sheet 1
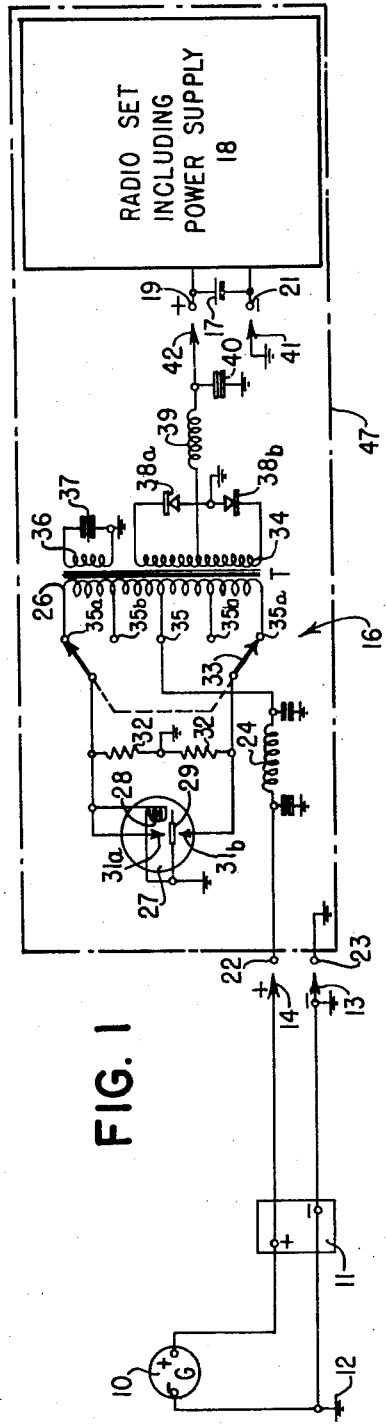
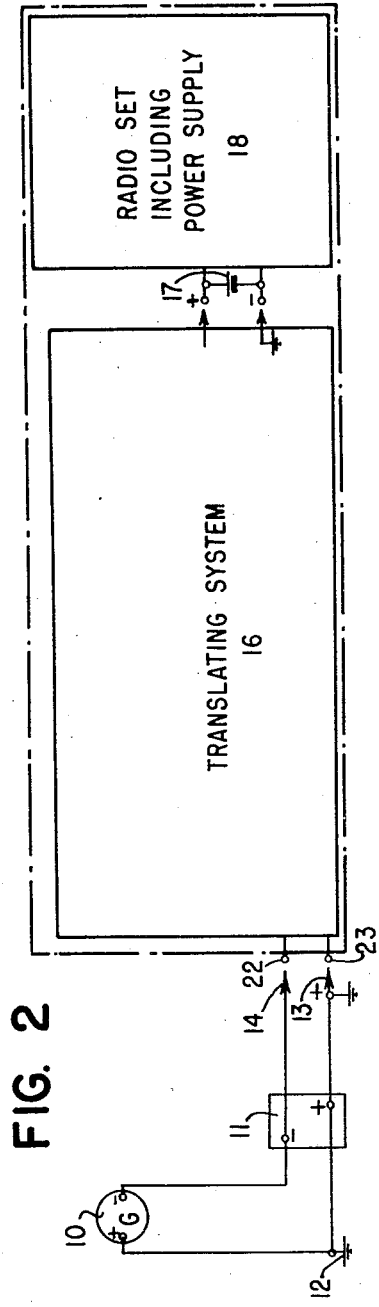
INVENTOR
DONALD H. MITCHELL
BY
Toomon L. Muello
ATTORNEY April 13, 1948.  D. H. MITCHELL  2,439,409
SYSTEM FOR PROVIDING AN ENERGIZING DIRECT CURRENT
Filed Feb. 6, 1943  2 Sheets-Sheet 2
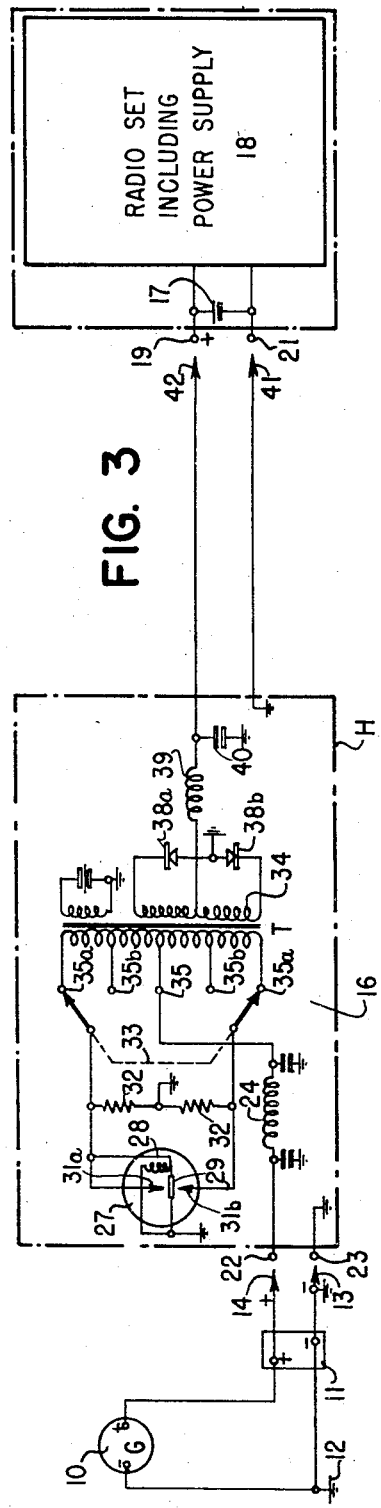
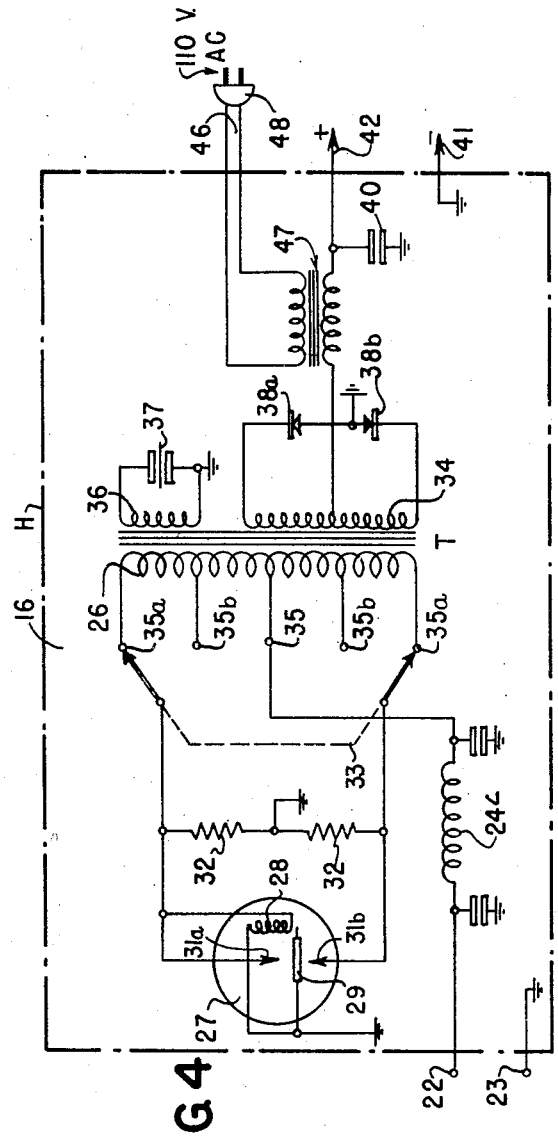
INVENTOR
DONALD H. MITCHELL
BY
ATTORNEY Patented Apr. 13, 1948

2,439,409

UNITED STATES PATENT OFFICE 2,439,409

SYSTEM FOR PROVIDING AN ENERGIZING DIRECT CURRENT

Donald H. Mitchell, Chicago, Ill., assignor to Motorola, Inc., a corporation of Illinois Application February 6, 1943, Serial No. 474,950

2 Claims. (Cl. 320—25)

The present invention relates to an improved method and apparatus for converting direct current derived from an alternating current source or a direct current source of any polarity into direct current of a predetermined polarity for transmission to an energizable device, so that in setting up the electrical connections between the source and the energizable device there will be no necessity for matching the polarity of the source with that required for energization of the device.

In the disclosed embodiment of the invention, the direct current distribution system of an automobile, truck, boat, or in fact any vehicle, is utilized to supply the charging current for the storage battery of a portable radio set, which battery may be detachably connected to the vehicle distribution circuit. By means of the present invention, the radio set battery is charged by direct current of a predetermined polarity, which is entirely independent of the current polarity at the input terminals of the charging or translating equipment. The system thus makes it possible to readily connect a radio set storage battery to receive a charge from a source of charging current, without any preliminary experimental determination of terminal polarities of the charging current source. It will be understood in this regard that the polarity of charging current derived through output connections from the charging or current distribution circuits of different vehicles, varies as between vehicles of different types and makes.

Systems are available in the prior art for charging auxiliary batteries which are permanently connected into the direct current charging or generating system of a vehicle, and for charging the storage batteries of portable devices such as radio sets and auxiliary lamps, which may be removably connected into the charging system. In utilizing these prior systems, however, it is necessary that the terminal polarities of the auxiliary battery match the terminal polarities of the source from which the charging current is derived. If these polarities are not matched the auxiliary battery is discharged rather than charged during the attempted charging operation. Since there is no uniformity, in so far as polarity is concerned, in the design of vehicular charging or current distribution systems, it is imperative, when using the auxiliary battery charging arrangements of the prior art, that polarity checks be made before the small, rather fragile storage battery of a portable radio set, for example, is connected into a vehicular current distribution system to receive charging current. Polarity checks of this character are inconvenient at any time, and are actually impossible in those cases where the necessary meter is not available. In some instances, the small auxiliary batteries are charged from a large storage battery, either a vehicle or separate therefrom, rather than from the generator of a vehicle, but even in such cases polarity checks are necessary before connecting the two batteries together, in order to insure that the auxiliary battery will be charged. Moreover, no provisions whatever are made in the prior art arrangements for permitting direct current sources of different voltages or alternating current sources to be used in the production of direct current of a required polarity and voltage.

It is an object of the present invention, therefore, to provide an improved method and apparatus for producing direct current of a predetermined polarity, which polarity will remain the same independently of, and irrespective of, the polarity of a direct current source from which the energizing current is derived.

According to another object of the invention, an improved arrangement is provided for delivering current of a predetermined polarity to a portable electrical device from a direct current source of indiscriminate polarity, without the necessity of making polarity checks in connecting the device to the source.

It is a further object of the present invention to provide an improved and exceedingly simple arrangement for charging the storage battery of a portable radio receiver from direct current sources of indiscriminate and indeterminate polarities.

It is still another object of the present invention to provide an improved system of the character described which includes facilities for supplying direct current of a predetermined and desired polarity when energized either from an alternating current source or from any one of a number of direct current sources of indiscriminate polarities.

According to a still further object of the invention, provisions are made in the system whereby a single rectifier circuit is used in the production of current of the particular desired polarity, regardless of the character of the source from which the current for energizing the system is derived.

In accordance with still another object of the invention, the transformer which is provided for introducing alternating current into the rectifier circuit of the system is arranged to be utilized as an ouput current smoothing device when the system is connected for energization from a direct current source.

One of the features of the present invention relates to the provision of a translating system arranged for electrical connection intermediate a direct current energizing source and a device to be energized, in a manner such that an energizing direct current of a predetermined uniform polarity is developed, which is independent of the polarity of the direct current energizing source, whereby the energizable device can be connected to the translating system with the assurance that the polarity of the current delivered to the energizable device will always be that which is desired.

According to another feature of the invention, an independent unit is provided for removable connection between a battery charging circuit and a battery to be charged, which unit includes a translating circuit for producing charging current of a polarity which is entirely independent of the polarity of the current delivered to the translating circuit from the battery charging circuit.

Other objects, features, and advantages of the invention will be apparent from the following description and the drawings, in which:

Fig. 1 is a diagrammatic illustration of a complete electrical system characterized by the features of the present invention, and including an energizing source circuit, a translating circuit, and a radio set including a storage battery;

Fig. 2 is an abbreviated diagrammatic illustration of a system similar to that of Fig. 1 except that the polarity at the energizing source circuit is the reverse of that illustrated in Fig. 1;

Fig. 3 schematically illustrates a system electrically equivalent to that shown in Fig. 1, but with the translating circuit provided in an independent housing and being itself removably connected intermediate the charging circuit, and a radio set; and Fig. 4 schematically illustrates a modification of the translating circuit which permits an alternating current source to be utilized for energizing the circuit when a direct current source is not available.

Referring now more particularly to Fig. 1 of the drawings, the system there illustrated comprises a direct current generator 10, a storage battery 11, a translating circuit 16 and the storage battery 17 of a portable radio set 18, arranged to be connected in tandem in the order named. The parallel connected generator 10 and storage battery 11 are arranged to supply current to the distribution system of an automobile or other vehicle, which system may include the usual current consuming devices, such, for example as lamps, a fan motor and the engine driving motor of the starting facilities. The respective negative terminals of these units are both connected to the frame 12 of the vehicle as indicated by the conventional polarity markings shown in the drawings. The conductors for delivering current to the translating circuit 16 from the energizing or charging sources 10 and 11 respectively terminate at terminals 13 and 14, which in the illustrated embodiment are preferably receptacle or jack sockets into which jack pins may be inserted for the purpose of connecting the translating circuit thereto. The terminal or connector 13 is connected to the frame of the vehicle and is therefore of negative polarity, while the terminal or connector 14 is of positive polarity.

Briefly considered, the translating system 16 comprises input terminals or conductors 22 and 23, which may be in the form of jack pins arranged for insertion in the pin sockets 14 and 13 respectively; output terminals or conductors 41 and 42 which may be in the form of jack pins arranged for connection with the receptacle sockets 21 and 19 connected respectively to the negative and positive terminals of the storage battery 17; a converter for transforming a direct voltage applied to the terminals 22 and 23 into an alternating voltage of a desired value; and a full wave rectifier circuit for reconverting the alternating voltage into a direct voltage which appears between the output terminals 41 and 42. The converter is of the electro-mechanical type and includes an inductive coupling device in the form of a transformer T having a secondary winding 34 included in the rectifier circuit, a tapped primary winding 26, and a buffer winding 36 which is shunted by a buffer condenser 37 to resonate at a frequency substantially equal to that of the voltage induced in the secondary winding 34 during operation of the converter. The incircuited sections of the transformer primary winding 26 are arranged to be energized through the contacts of a tap changing switch 33 and the choke coil of a hash or noise filter 24 by the direct voltage applied between the input terminals 22 and 23 from a source of direct current. The purpose of providing the tap changing switch 33 in the available circuit for energizing the primary winding 26 is that of variably including different portions of this winding in the circuit in order to adapt the converter for energization from direct current sources of different voltages. In the illustrated arrangement, wherein the contact wipers of the switch 33 may, by means of a single control element, be operated concurrently to engage either the outer transformer taps 35a or the intermediate transformer taps 35b, thereby either to include or exclude the outer sections of the primary winding 26 from the circuit for energizing this winding, it is contemplated that the converter may be designed for energization either from a conventional 12 volt source or a conventional 6 volt source of direct current. For the purpose of alternately energizing the incircuited upper and lower sections of the primary winding 26, i. e., those incircuited sections disposed on opposite sides of the center tap 35, there is provided a control device in the form of a vibratory reed relay 27 having a weighted armature 29 which carries contacts arranged alternately to engage the stationary contacts 31a and 31b, respectively included in the circuits for energizing the upper and lower incircuited sections of the primary winding 26. The relay 27 further comprises a driving magnet 28 which, when energized, functions to attract the weighted armature 29 so that one of the contacts carried thereby engages the stationary contact 31a.

For the purpose of minimizing the energy dissipated at the contacts 31a and 31b, occasioned by the making and breaking of circuits through these contacts, and for the additional purpose of limiting the peak voltages developed in the incircuited sections of the primary winding 26, a resistor 32 is bridged across the movable wipers of the tap changing switch 33 and is provided with a center tap which is connected to the negative input terminal 23. With this arrangement the upper and lower halves of the resistor 32 provide resistive shunts across the incircuited upper and lower sections of the primary winding 26 and also across the two sets of contacts of the relay 27.

The full wave rectifier circuit, through which the alternating voltage induced in the transformer secondary winding 34 is converted into a direct voltage appearing across the output terminals 41 and 42, comprises two rectifier elements 38a and 38b, which may be of the copper oxide type, for example, connected in series across the outer terminals of the secondary winding 34 and provided with a connection to the negative output terminal 41 at the junction therebetween. It is noted that the directions of the arrows in the symbols illustrating the rectifiers 38a and 38b conventionally indicate the respective directions in which current may be passed through these elements, rather than the directions of electron flow therethrough. The rectifier circuit is completed by providing a connection between the center tap of the secondary winding 34 and the opposite output terminal 42 which has serially included therein a filter choke 39. The filtering action of this choke is supplemented by a smoothing condenser 40 which is bridged across the output terminals 41 and 42 of the translating system.

Briefly to consider the method of operation of the system, it will be understood that when the terminals 41 and 42 are connected to the battery charging terminals 21 and 19, respectively, and the input terminals 22 and 23 of the translating circuit are connected to the terminals 14 and 13, respectively, of the illustrated current sources 10 and 11, the system is conditioned for operation. Assuming that the movable contacts of the tap changing switch 33 occupy the positions illustrated in the drawings, a circuit is completed for energizing the upper half of the primary winding 26 in series with the operating winding 28 of the relay 27 when the input terminals 22 and 23 are connected to the terminals 14 and 13 of the direct current source. This circuit, in the direction of current flow thereover, extends from the positive terminals of the generator 10 and the storage battery 11 by way of the connected terminals 14 and 22, the choke coil of the filter network 24, the upper half of the primary winding 26, the upper movable contact wiper of the tap switch 33, the contact 31a, the armature 29, the winding 28, and the connected terminals 23 and 13 to the negative terminals of the battery 11 and the generator 10. When this circuit is completed, the weighted armature 29 of the relay 27 is attracted to engage the stationary contact 31a so that the high resistance driving winding 28 is short-circuited substantially to increase the energization of the upper half of the primary winding 26, which is of relatively low resistance. When the driving winding 28 of the relay 27 is thus deenergized, the armature 29 thereof is released and swings through its normal position to the opposite offnormal position thereof wherein the circuit for energizing the upper half of the primary winding 26 is broken at the contact 31a and a circuit through the contact 31b is established for energizing the lower half of this winding. Current from the energizing sources 10 and 11 traverses the last-mentioned circuit in a direction which extends from the positive terminal of the storage battery 11 by way of the connected terminals 14 and 22, the choke coil of the filter 24, the lower half of the primary winding 26, the lower movable contact wiper of the tap switch 33, the contact 31b, the armature 29, and the connected terminals 23 and 13 to the negative terminal of the current source. Incident to the disengagement of the armature 29 from the contact 31a, the winding 28 is again serially included in the circuit for energizing the upper half of the primary winding 26, so that shortly after this armature engages the contact 31b it is again attracted out of engagement with this contact and back into engagement with the contact 31a. Thus the lower half of the primary winding 26 is deenergized, and the circuit for energizing the upper half of the primary winding 26 is recompleted.

From this point on, the manner in which the relay 27 functions alternately and periodically to transmit current through the two halves of the primary winding 26 is exactly the same as explained above. From a consideration of the above-traced circuits it will be understood that current flows through the two halves of the primary winding 26 in opposite directions during the alternate periods when the circuits for energizing these winding halves are completed. Accordingly an alternating voltage is induced in the secondary winding 34 through the inductive coupling between this winding and the primary winding 26. During continued operation of the system, and each time the potential of the upper terminal of the secondary winding 34 becomes negative with respect to the center tap of this winding, current traverses the storage battery 17 in a direction which extends from the positive center tap by way of the choke coil 39, the connected terminals 42 and 19, the battery 17, the connected terminals 21 and 41, and the rectifier element 38a to the upper negative terminal of the winding 34. This current flow occurs only during alternate half-cycles of the voltage induced in the secondary winding 34. During the opposite half-cycles of this voltage, the rectifier element 38a prevents the voltage developed in the upper half of the secondary winding 34 from causing current flow through the battery 17. Also during such opposite half-cycles of the voltage induced in the secondary winding 34, the center tap of this winding becomes positive with respect to the lower terminal of this winding, so that current traverses the battery 17 over a circuit and in a direction which extends from the positive midpoint of the winding 34 by way of the choke coil 39, the connected terminals 42 and 19, the battery 17, the connected terminals 21 and 41, and the rectifier element 38b to the lower negative terminal of the winding 34. Here again it will be understood that during alternate half-cycles of the voltage induced in the winding 34 the rectifier element 38b prevents the portion of this voltage appearing in the lower half of the secondary winding from causing current flow through the storage battery 17.

From the above explanation it will be apparent that during operation of the system, current traverses the storage battery 17 in a direction extending from the positive output terminal 42 of the translating circuit to the negative output terminal 41 of this circuit, and that this current polarity is maintained regardless of the polarity of the voltage impressed across the input terminals 22 and 23 of the circuit. This is true for the reason that the converter provided in the translating channel is equipped with the transformer T having the function of isolating the rectifier circuit from the input terminals 22 and 23. More specifically, all energy transfer between the input and output terminals of the translating circuit is accomplished through the inductive coupling between the primary and secondary windings of the transformer T, which coupling has the function of abolishing the polarity of the voltage impressed across the input terminals 22 and 23. Stated in other words, all that the rectifier circuit comprising the secondary winding 34 requires to maintain current flow in the direction established by the polarities of the rectifiers 38a and 38b is that an alternating voltage be introduced therein. When such a voltage is induced in the winding 34 of this circuit in the manner explained above, for example, the rectifier elements 38a and 38b function to maintain the desired direction of current flow from the output terminal 42 to the opposite terminal 41, regardless of how the voltage is applied to the winding 34. By virtue of this arrangement, the input terminals 22 and 23 of the translating circuit may be reversely connected to the terminals 13 and 14 of the current sources 10 and 11 without in any way affecting the polarity of current flow between the output terminals 42 and 41 to which the storage battery 17 is connected. This permits the terminals 22 and 23 to be indiscriminately connected to the terminals 13 and 14 without any preliminary polarity checks and with complete assurance that a charging current will be supplied to the battery 17 regardless of how the connections are made.

To further illustrate the importance of this feature, it is pointed out that the current distribution system of the vehicle from which current is derived may not be of the form illustrated in Fig. 1 of the drawings, but rather may be of the character shown in Fig. 2, wherein the positive side of the system is connected to the grounded frame of the vehicle and the negative side of the system constitutes the high potential side thereof. With the described arrangement of the translating circuit, however, the character of the particular current distribution system to which the input terminals 22 and 23 are connected is of no consequence, since these terminals may be indiscriminately connected, without polarity checks to the output terminals 13 and 14 of the distribution system without reversing the polarity of current flow between the output terminals 42 and 41.

It will also be understood from the foregoing explanation that the presence of the inductive coupling device T in the channel through which energy is delivered to the storage battery 17 prevents current flow from this battery to the current distribution system of the vehicle, if for any reason a short circuit or low resistance path is established between the terminals 13 and 14 of the distribution system. In this regard it will also be noted that the rectifier elements 38a and 38b are so poled as to block current flow through the winding 34 from the battery 17 during those periods when the translating circuit is not connected to a source of direct current. Thus every facility is provided in the system to safeguard the battery 17 against undesired current drain.

In the above-described embodiment of the invention, a single housing 47 indicated in dotted lines in Fig. 1 of the drawings is provided, which carries the translating circuit 16, the storage battery 17, and a desired radio set chassis, circuit, and component elements. The housing 47 which likewise carries an antenna for the radio set 18 may in turn be carried as a single portable unit by means of a strap swung over the shoulder of the operator, or by means of a handle adapted to be carried in the hand. These elements of the unit are not illustrated as such are unnecessary to an understanding of the present invention. A bracket may be mounted on a vehicle to receive the housing 47 with the terminals or connectors 13 and 14 exposed for corresponding physical and electrical connection with the jack or pin terminals 22 and 23 of the translating circuit.

A modified embodiment of the invention is illustrated in Fig. 3, wherein the translating circuit 16 is provided in an independent housing H and is equipped with connections 22 and 23 for detachable connection with the terminals 14 and 13 of the energizing current source. Output terminals 41 and 42 are likewise provided for detachably connecting the translating circuit to the storage battery 17 of the radio set 18. These terminals may be of any desired construction and may be secured on an extension cord extending from the housing H as diagrammatically illustrated or they may be provided directly on the housing H or immediately adjacent thereto. With this arrangement, current derived from the translating circuit may be used for any desired purpose. The utmost flexibility in adaptation is therefore provided and the same advantages with respect to constant current polarity at the output terminals are retained.

In providing the translating circuit as a separate unit, in the manner illustrated in Fig. 3 of the drawings, or in providing such circuit directly connected into the radio receiver circuit, as shown in Fig. 1 of the drawings, it sometimes develops that a direct current source is not available for supplying current to the translating circuit. To obviate this difficulty, the arrangement shown in Fig. 4 of the drawings may be employed. This arrangement is exactly the same as those shown in Figs. 1, 2, or 3, except that facilities are provided therein for introducing an alternating current into the rectifier circuit, which current is converted into a direct current at the terminals 41 and 42 of the same polarity as that developed when direct current is introduced into the translating circuit through the input terminals 22 and 23. These facilities include a transformer 47 having its secondary winding substituted for the choke coil 39 in the rectifier circuit, and its primary winding arranged for energization from a 110 volt commercial alternating current source over the contacts of the plug 48 and the conductors of the extension cord 46. With this arrangement, alternate half-cycles of an alternating current introduced into the rectifier circuit are passed by the rectifier elements 38a and 38b in parallel, so that half-wave rectification is imparted to the current traversing the output terminals 42 and 41. This pulsating direct current is smoothed through the action of the condenser 40 shunting the output terminals 41 and 42. Since the pulsating direct current traverses the two halves of the secondary winding in opposite directions it will be understood that no voltage is induced in either of the two windings 26 and 36. Thus, the possibility of an undesired voltage being developed between the input terminals 22 and 23 of the translating circuit is eliminated. It will be noted that, due to the action of the rectifiers 38a and 38b, the polarity of the current delivered to the output terminals 42 and 41 is exactly the same as that obtained when the input terminals 22 and 23 are connected to a direct current source. It will also be noted that in the operation of the translating circuit to supply current to a load connected to the terminals 41 and 42 from a direct current source connected to the input terminals 22 and 23, the transformer 47 functions as a smoothing impedance to eliminate ripple components from the output voltage.

As briefly indicated above, prior to the present invention, storage batteries on portable radio sets have been charged by making a removable connection with the generator circuit of an automotive vehicle. However, these prior charging systems require that the polarity of the charging current be the same as the polarity at the input connections to the storage battery on the radio set. If for any reason the polarities are reversed, the storage battery on the radio set cannot be charged, and under certain conditions, the set storage battery can actually be discharged into the vehicle current distribution circuit. This of course means that if no preliminary check is made in connecting the battery to the distribution circuit to determine the polarity of the distribution circuit, serious injury to the radio set storage battery may result. In general, this difficulty has prevented widespread and successful use of storage batteries in portable radio sets or other portable devices.

By the use of the present invention, however, the polarity of the direct current output to the radio set storage battery or other device to be energized, is predetermined and will remain the same irrespective of the polarity at the vehicle charging circuit terminals. Furthermore, by very simple adjustments in the present system, the charging voltage can be decreased relative to the voltage of the vehicle storage battery or charging circuit voltage so that a desired output voltage can be obtained at the radio set storage battery for charging the latter without the loss or dissipation of energy normally required in such an operation. As a result, the radio set 18 having the translating circuit 16 combined therewith can be quickly and accurately connected into the charging circuit of an automotive vehicle without preliminary preparations. Likewise the portable device including the translating circuit can, if desired, be connected directly to a direct current source, such, for example, as the storage battery 11, without devoting any attention to the terminal polarities of the source.

While two embodiments of the invention have been disclosed, it will be understood that various modifications may be made therein which are within the true spirit and scope of the invention.

I claim:

1. In an electrical system which includes a chargeable battery adapted to be charged by direct current of a predetermined polarity, apparatus for supplying charging current of said predetermined polarity to said battery from a low voltage direct current source of any polarity, comprising means for interrupting the flow of current from said source to provide a pulsating direct current, a transformer for converting said pulsating direct current into alternating current, said transformer including primary, secondary and tertiary windings, said primary winding being connected to said interrupting means and to said current source, said secondary winding having a center tap to provide two secondary portions, a pair of rectifiers connected across said secondary portions, means for connecting said rectifiers to said battery in such manner that the rectified current is of the predetermined polarity for charging said battery and that said battery is prevented from discharging through said system, and a condenser connected to said tertiary winding of such value to provide a closed circuit resonant at the frequency of said alternating current so that the current flowing through said primary winding is substantially zero when said current source is interrupted.

2. In an electrical system which includes a chargeable battery adapted to be charged by direct current of a predetermined polarity, translating means for supplying charging current of said predetermined polarity to said battery from any one of a plurality of low voltage direct current sources which may have different voltages and indiscriminate polarities that may not be readily ascertainable by unskilled users of the device and without test instruments, said translating means comprising in combination means for interrupting direct current derived from one of said sources to provide a pulsating direct current, a transformer including primary, secondary and tertiary windings for converting said pulsating direct current into alternating current, said primary winding being connected to said means for interrupting direct current and having a plurality of taps so that alternating current of the proper voltage may be obtained from sources having different voltages, a rectifier connected to said secondary winding for converting the alternating current derived therein into direct current, and a condenser connected to said tertiary winding of such value to provide a closed circuit resonant at the frequency of said alternating current so that said current flowing through said primary winding is substantially zero when said direct current is interrupted.

DONALD H. MITCHELL.

REFERENCES CITED

The following references are of record in the file of this patent:

UNITED STATES PATENTS

| Number | Name | Date |
| --- | --- | --- |
| 719,753 | Creveling | Feb. 3, 1903 |
| 2,021,380 | Raskhodoff | Nov. 19, 1935 |
| 2,103,135 | Andrews | Dec. 21, 1937 |
| 2,231,873 | Barrett | Feb. 18, 1941 |
| 2,251,302 | Stehlik | Aug. 5, 1941 |
| 2,280,465 | Barrett, Jr., et al. | Apr. 21, 1942 |